(12) United States Patent
Ochi

(10) Patent No.: US 8,720,506 B2
(45) Date of Patent: May 13, 2014

(54) PNEUMATIC TIRE

(75) Inventor: Naoya Ochi, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 511 days.

(21) Appl. No.: 13/063,835

(22) PCT Filed: Aug. 31, 2009

(86) PCT No.: PCT/JP2009/065179
§ 371 (c)(1),
(2), (4) Date: Mar. 14, 2011

(87) PCT Pub. No.: WO2010/032606
PCT Pub. Date: Mar. 25, 2010

(65) Prior Publication Data
US 2011/0162768 A1 Jul. 7, 2011

(30) Foreign Application Priority Data
Sep. 16, 2008 (JP) ................... 2008-236342
Sep. 24, 2008 (JP) ................... 2008-244542

(51) Int. Cl.
B60C 11/11 (2006.01)
B60C 11/117 (2006.01)

(52) U.S. Cl.
USPC .......... 152/209.15; 152/902; 152/209.17

(58) Field of Classification Search
CPC .......... B60C 11/032; B60C 11/0332; B60C 11/0306; B60C 11/033; B60C 11/11; B60C 11/03; B60C 2011/03
USPC .......... 152/209.1, 209.2, 209.3, 209.15, 902; 152/209.17, 209.18
See application file for complete search history.

(56) References Cited

U.S. PATENT DOCUMENTS 1,504,694 A * 8/1924 Litchfield ............. 152/209.22
2,152,883 A * 4/1939 Eudy ..................... 152/209.18
(Continued)

FOREIGN PATENT DOCUMENTS

GB 520231 A 4/1940
JP 03-208705 A 9/1991
(Continued)

OTHER PUBLICATIONS

Extended European Search Report issued in European Application No. 09814451 dated Mar. 26, 2012.
(Continued)

Primary Examiner — Eric Hug
(74) Attorney, Agent, or Firm — Sughrue Mion, PLLC

(57) ABSTRACT

To significantly improve performances on ice by optimizing a tread pattern.
This pneumatic tire has, in at least a part of a tread portion 1, a block group $G_B$ formed by arranging blocks 3 close to each other, the blocks being defined by grooves 2 and being independent of each other, and when a symbol P (mm) stands for a reference pitch length of the blocks in the block group $G_B$, a symbol W (mm) stands for a width of the block group $G_B$, a symbol a (pieces) stands for the number of the blocks 3 existing in a reference zone Z of the block group $G_B$, the reference zone being comparted by the reference pitch length P and the width W, and a symbol N (%) stands for a negative ratio in the reference zone Z, a block number density S, which is the number of the blocks per unit of an actual ground contact area of the block group $G_B$ and given by a formula of $S=a/\{P \times W \times (1-N/100)\}$, is set within a range of not less than 0.003 (pieces/mm$^2$) but not more than 0.04 (pieces/mm$^2$).

5 Claims, 18 Drawing Sheets

(56) References Cited

U.S. PATENT DOCUMENTS

| | | | | |
|---|---|---|---|---|
| D162,410 S | * | 3/1951 | Hawkinson | D12/574 |
| 3,986,545 A | * | 10/1976 | Montagne | 152/209.1 |
| 3,998,256 A | * | 12/1976 | Verdier | 152/209.1 |
| 4,798,236 A | * | 1/1989 | Fujiwara | 152/209.18 |
| 5,031,680 A | * | 7/1991 | Kajikawa et al. | 152/209.18 |
| 6,003,575 A | | 12/1999 | Koyama et al. | |

FOREIGN PATENT DOCUMENTS

| | | |
|---|---|---|
| JP | 08-002215 A | 1/1996 |
| JP | 08-318710 A | 12/1996 |
| JP | 11-001106 A | 1/1999 |
| JP | 2001-191739 A | 7/2001 |
| JP | 2004-142549 A | 5/2004 |
| JP | 2007-118704 A | 5/2007 |
| JP | 2007-186121 A | 7/2007 |

OTHER PUBLICATIONS

Chinese Office Action dated Dec. 3, 2012 issued in Chinese Patent Application No. 200980142181.9.
International Search Report PCT/JP2009/065179, Nov. 2, 2009.
Chinese Office Action, dated Dec. 6, 2013, issued in corresponding Chinese Patent Application No. 200980142181.9.
Japanese Office Action issued in Japanese Application No. 2010-529706 dated Jun. 11, 2013.
Chinese Office Action issued in Chinese Application No. 200980142181.9 dated Jul. 10, 2013.
Japanese Office Action, dated Dec. 17, 2013, issued in corresponding Japanese Patent Application No. 2010-529706.

* cited by examiner

PNEUMATIC TIRE

This is a National Stage of International Application No. PCT/JP2009/065179 filed Aug. 31, 2009, claiming priority based on Japanese Patent Application No. 2008-236342 filed Sep. 16, 2008 and 2008-244542 filed Sep. 24, 2008, the contents of all of which are incorporated herein by reference in their entirety.

TECHNICAL FIELD

The present invention relates to a pneumatic tire having, in a tread portion, blocks defined by grooves, and more specifically, proposes a technique that can achieve a significant improvement in performances on ice.

RELATED ART

Conventionally, for a pneumatic tire, it is widely implemented that blocks are defined by main grooves and lateral grooves, and sipes are added in the defined blocks in order to improve an edge effect, thereby enhancing drive, braking and cornering performances on a wet road surface, iced road surface and the like (for example, Patent Literature 1).

RELATED ART DOCUMENT

Patent Literature

Patent Literature 1: Japanese Patent Application Laid-open No. 2001-191739

DISCLOSURE OF THE INVENTION

Problems to be Solved by the Invention

However, although the sipes provided to the blocks improve the edge effect, the rigidity of the divided block portions defined by the sipes becomes undesirably low, causing collapse of the divided block portions at the time when these portions are brought into contact with the road surface, thereby deteriorating a ground contact property. Therefore, it was difficult to obtain a performance on ice sufficient to match the recent vehicle with much improved performance. This is particularly matter for a tire that drives on iced road surface with load. More specifically, a pneumatic tire for winter, whose main purpose is to travel on the iced road surface, is required to be provided with more sipes on the blocks to respond to the demand for higher driving, braking and cornering performances. This fact makes the problem as described above more pronounced. Further, in the conventional pneumatic tire as described above, each block is formed relatively larger for the purpose of increasing a ground contact area so as to improve the performance on ice, and hence, water screen cannot be removed efficiently at the central areas of the blocks, also constituting a hindrance to improving the performance on ice.

Therefore, a problem of the present invention is to solve the problems described above, and an object of the present invention is to significantly improve the performances on ice by optimizing a tread pattern.

Means for Solving the Problem

To achieve the object above, a pneumatic tire according to the present invention provides pneumatic tire having, in at least a part of a tread portion, a block group formed by arranging blocks close to each other, the blocks being defined by grooves and being independent of each other, in which, when a symbol P (mm) stands for a reference pitch length of the blocks in the block group, a symbol W (mm) stands for a width of the block group, a symbol a (pieces) stands for the number of the blocks existing in a reference zone of the block group, the reference zone being comparted by the reference pitch length P and the width W, and a symbol N (%) stands for a negative ratio in the reference zone, a block number density S, which is the number of the blocks per unit of an actual ground contact area of the block group and given by a formula of $S = a/\{P \times W \times (1-N/100)\}$, is set within a range of not less than 0.003 (pieces/mm$^2$) but not more than 0.04 (pieces/mm$^2$).

It should be noted that the term "reference pitch length of a block" in this specification refers to the minimum unit of a repeating pattern of blocks in a given block line constituting the block group, and for example, in a case where the repeating pattern is defined by one block and grooves demarcating said block, the reference pitch length of the block is obtained by adding the length of one block in the tread circumferential direction to the length of one groove in the tread circumferential direction, said groove being adjacent to said block in the tread circumferential direction.

Further, the term "width W of the block group" refers to the length of the block group in the tread width direction, the block group being formed by arranging the blocks so as to be closed to each other. For example, it refers to a ground contact width of the tread if the block group extends on the entire tread. Further, the term "ground contact width of the tread" refers to a width in a case where: a tire is assembled with a standard rim having an applicable size specified under an industrial standard effective in a region where the tire is manufactured or used, the industrial standard including "Year Book" of The Tire and Rim Association, Inc. in the United States, "Standards Manual" of European Tyre and Rim Technical Organisation in Europe, and "JATMA Year Book" of The Japan Automobile Tyre Manufacturers Association in Japan; the tire is inflated at a pneumatic pressure corresponding to a maximum weight (maximum load capacity) per wheel with the applicable size specified under said industrial standard and a maximum weight; and the tire is loaded with the maximum load capacity.

The term "actual ground contact area" of the block group refers to a total surface area of all of the blocks existing in the reference zone of the block group. In other words, the actual ground contact area represents an area which is obtained by subtracting area of grooves defining the blocks from the area of the reference zone obtained by multiplying the reference pitch length P by the width W. Note that, even if small holes described later are provided to the blocks in the block group, these small holes are not taken into consideration in the calculation of the actual ground contact area.

Further, the term "a block number density" refers to, as a density, how many blocks exist per unit of actual ground contact area in the reference zone.

In the pneumatic tire according to the present invention, since blocks are arranged so as to be closed to each other while sufficient groove areas are secured in a block group, it is possible to increase the total edge length of the blocks in the block group and to vary the edge directions, whereby it is possible to obtain excellent edge effect. Further, since the ground contact area of each of the block is reduced, it is possible to improve a ground contact property of the blocks. Additionally, by way of making each of the block smaller, it is possible to reduce the length from the central zone of the block to the peripheral edge of the block, whereby it is possible to improve a removal effect of the water screen by the blocks.

Therefore, according to the pneumatic tire of the present invention, it is possible to significantly improve the performances on ice by achieving the securing of excellent ground contact property and edge effect, and efficient removal of the water screen by the blocks.

It should be noted that, in the pneumatic tire according to the present invention, the blocks are preferably arranged in a zigzag alignment.

Further, in the pneumatic tire according to the present invention, it is preferable that at least one small hole opening to a surface of the tread portion are provided on more than one block constituting the block group.

Yet further, in the pneumatic tire according to the present invention, it is preferable that a diameter at an opening portion of the small hole is in a range of not less than 0.5 mm but not more than 3.5 mm.

Still yet further, in the pneumatic tire according to the present invention, it is preferable that a depth of the small hole is in a range of not less than 5% but not more than 100% of a height of a block to which said small hole is provided.

Effect of the Invention

According to the pneumatic tire of the present invention, it is possible to significantly improve performances on ice by achieving securing of excellent ground contact property and edge effect, and efficient removal of the water screen by blocks.

BEST MODE FOR CARRYING OUT THE INVENTION

Figure 1:
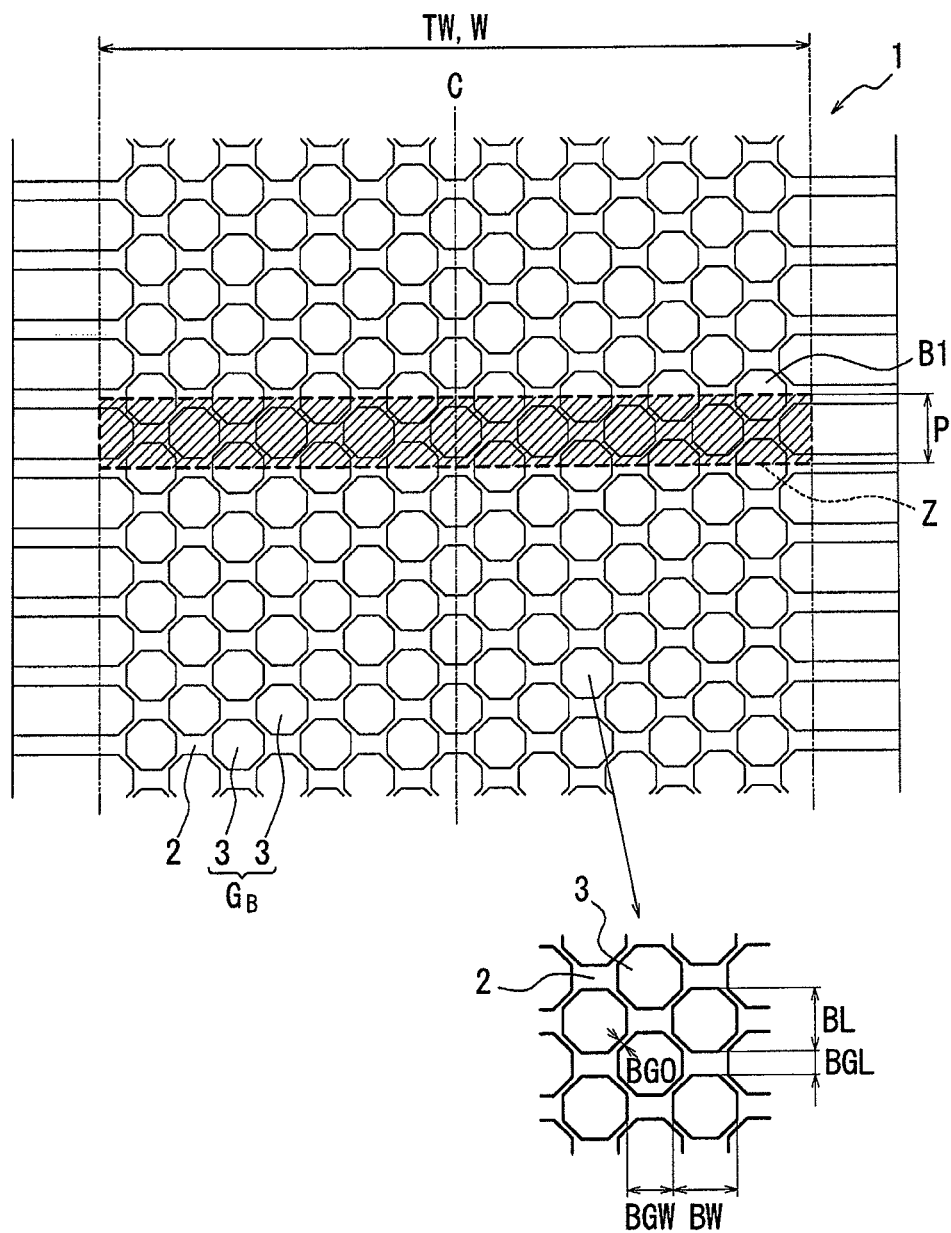
FIG. 1 is a partial development view illustrating a tread pattern of a pneumatic tire (tire of Example 3) according to an embodiment of the present invention.

Hereinbelow, embodiments of the present invention will be described with reference to the drawings. FIG. 1 is a partial development view illustrating a tread pattern of a pneumatic tire (hereinafter, referred to as "tire") according to an embodiment of the present invention. Note that, in the drawing, a vertical direction represents a tread circumferential direction, and a horizontal direction (direction perpendicularly intersecting an equatorial plane C) represents a tread width direction.

Although not shown, a tire according this embodiment has a tire structure according to the conventional practice, the structure including a carcass toroidally extending between a pair of right and left bead cores, a belt disposed on the outside of a crown portion of said carcass in the tire radial direction, and, a tread portion disposed on the outside of said belt in the tire radial direction. Further, the tire has a tread pattern illustrated in FIG. 1 on the tread portion.

As illustrated in FIG. 1, on the tread portion 1, this tire has a block group $G_B$ formed such that plural independent blocks 3 defined by grooves 2 are arranged so as to be close to each other. The block group $G_B$ exists on the entire tread portion 1. It is preferable that the outer shape of the surface of each of the blocks 3 is a polygon, and is an octagon in this example, and the respective blocks 3 are arranged in a zigzag alignment in the tread circumferential direction. It is preferable that, in a case where a main groove (for example, a circumferential groove 4 described later) is provided to the tread portion 1 (see FIG. 7), the block height of each of the blocks 3 is in a range of 60 to 100% of a groove depth of the main groove, and more preferably in a range of 70 to 90%. Further, in this tire, a block number density S (piece/mm$^2$) per unit actual ground contact area of the block group, which is expressed by the following Equation 1, falls in a range of not less than 0.003 piece/mm$^2$ but not more than 0.04 piece/mm$^2$, where P (mm) is a reference pitch length of each of the blocks 3 in the block group $G_B$; W (mm) is a width of the block group $G_B$ (equal to a tread ground contact width TW because the blocks 3 are arranged on the entire tread portion 1 in this embodiment); a (piece) is the number of the blocks 3 existing in a reference zone Z (hatched area in the drawing) of the block group $G_B$ defined by the reference pitch length P and the width W; and, N (%) is a negative ratio in the reference zone Z.

$$S = \frac{a}{P \times W \times (1 - N/100)} \quad \text{[Equation 1]}$$

FIG. 2 through FIG. 6 illustrate tread portions in which the block number density S varies in a range of 0.003 piece/mm² to 0.04 piece/mm². Note that, in a case where the block 3 extends over both inside and outside of the reference zone Z and cannot be counted as one block, the number of the block is counted by using a proportion of the remaining area of the block 3 remaining in the reference zone with respect to the surface area of the block 3, at the time of counting the number a of the blocks 3 existing in the reference zone Z of the block group. For example, in a case of a block that extends over both inside and outside of the reference zone Z and only a half of which exists in the reference zone Z as is the case with the block indicated by a reference character B1 in FIG. 1, such the block can be counted as ½ piece.

In the tire according to this embodiment, since the blocks 3 are arranged so as to be close to each other while a sufficient groove area is secured in the block group $G_B$, it is possible to increase the total edge length of the blocks 3 in the block group $G_B$ and to vary the edge directions (increase the number of edges directed in different directions), whereby it is possible to obtain the excellent edge effect. Further, since the ground contact surface of each of the block 3 is reduced, it is possible to improve the ground contact property of the blocks. Additionally, by way of making each of the block smaller, it is possible to reduce the length from the central zone of each of the block 3 to the peripheral edge of the block, whereby it is possible to improve a removal effect of the water screen by the blocks 3.

Therefore, with the tire according to this embodiment, the excellent ground contact property and edge effect are secured, and the water screen is efficiently removed by the blocks 3, whereby it is possible to significantly improve the performances on ice. Note that, by setting the number density S of the blocks 3 in the block group $G_B$ in the range of 0.0035 to 0.03 piece/mm², both the block rigidity and the edge effect can be achieved at a high level, whereby it is possible to more effectively improve the performance on ice.

Further, with the tire according to this embodiment, the respective blocks 3 are arranged in the zigzag alignment. Therefore, more blocks 3 can be formed, and the edges thereof are sequentially made function at the time when the tire is rotated, whereby it is possible to achieve the further excellent edge effect. Yet further, the timing at which the blocks are brought into contact with the road surface can be varied between the blocks 3 adjacent to each other in the tread width direction, whereby it is possible to reduce pattern noise. Yet further, by arranging the blocks 3 in the zigzag alignment as described above, it is possible to easily realize the high density arrangement of the blocks 3. Moreover, the adjacent blocks are brought into contact with each other, and are supported with each other at the time when the tire is rotated, whereby it is possible to enhance the rigidity of the blocks 3 and improve the driving stability.

Incidentally, in the present invention, it is preferable for the negative ratio N (small holes are ignored in the calculation of the negative ratio) of the block group $G_B$ to be in a range of 5% to 50%. This is because, in a case where the negative ratio of the block group $G_B$ is less than 5%, the groove area is undesirably small, resulting in insufficient water evacuation property, and the size of each block is undesirably large, making it difficult to achieve the desired edge effect. On the other hand, in a case where the negative ratio exceeds 50%, the ground contact area is undesirably small, possibly deteriorating the driving stability. Further, in a case where the number density S of the blocks 3 of the block group $G_B$ is less than 0.003 (piece/mm²), it is difficult to achieve the high edge effect without forming the sipes, and on the other hand, in a case where the number density S of the blocks 3 exceeds 0.04 (piece/mm²), the blocks 3 are undesirably small, and it is difficult to achieve the desired block rigidity.

Figure 7:
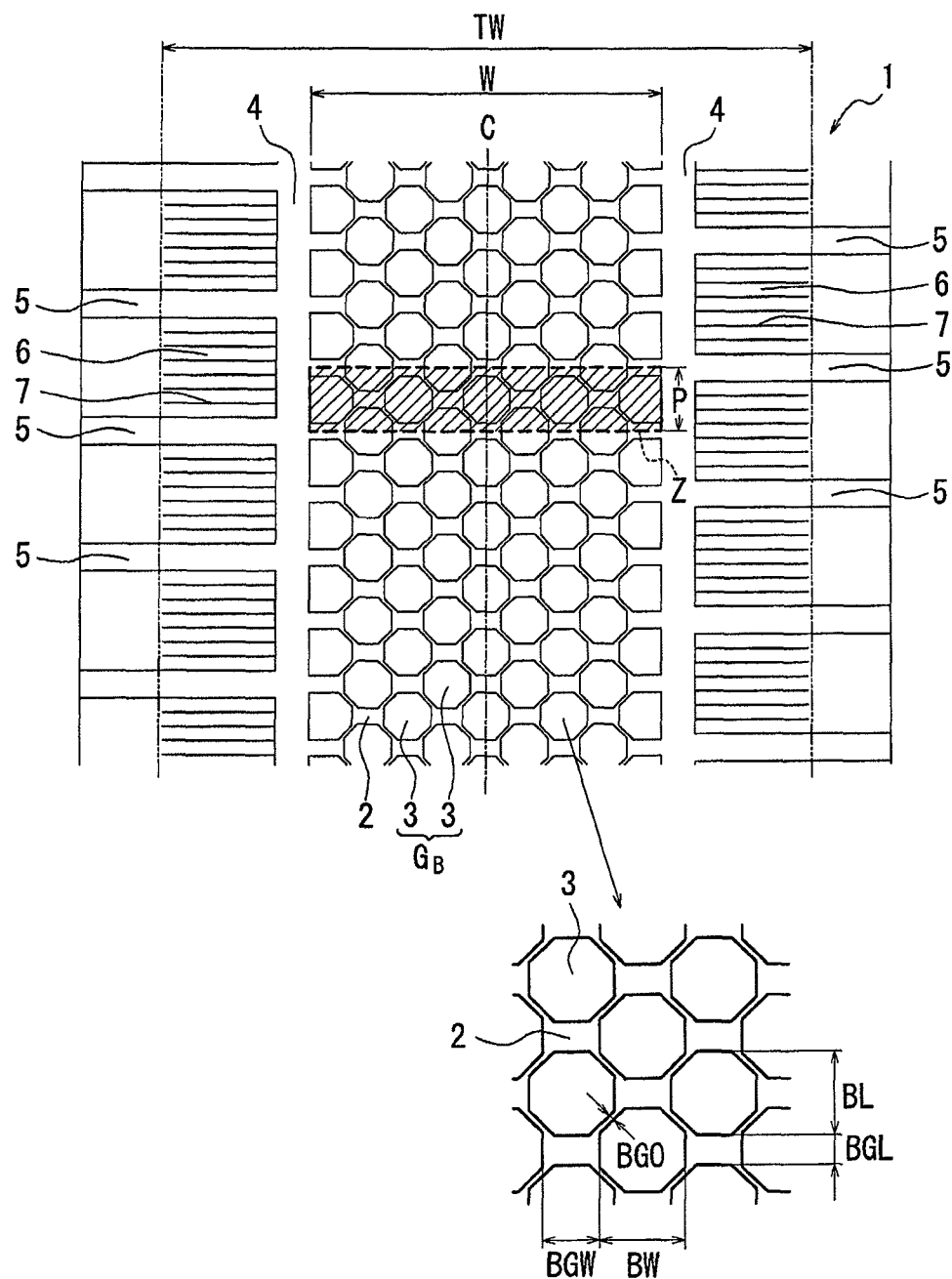
FIG. 7 is a partial development view illustrating a tread pattern of a pneumatic tire (tire of Example 7) according to another embodiment of the present invention.

Next, other embodiment according to the present invention will be described. FIG. 7 is a development view illustrating a tread pattern of a tire according to the other embodiment of the present invention. Note that elements identical with those illustrated in FIG. 1 are denoted with identical reference characters, and explanation thereof is omitted.

This tire has, on a part of the tread portion 1, a block group $G_B$ formed such that plural independent blocks 3 defined by grooves are arranged so as to be close to each other. The block group $G_B$ exists at the respect sides of the equatorial plane C within an area of about 50% (54% in the example illustrated in the drawing) of the tread ground contact width TW. In this example, the outer shape of the surface of each of the blocks 3 is an octagon, and the respective blocks 3 are arranged in a zigzag alignment in the tread circumferential direction. Further, at the respective outer sides of the block group $G_B$ in the tread width direction, there is provided circumferential grooves 4 extending along the tread circumferential direction. Yet further, at the outer side of each of said circumferential grooves 4 in the tread width direction, there are shoulder blocks 6 defined by plural lateral grooves 5 running in the tread width direction and said circumferential groove 4. In each of the formed shoulder blocks 6, there are provided plural sipes 7 each running in the tread width direction. Further, the block number density S per unit actual ground contact area of the block group, which is obtained by the equation described above, is set in a range of not less than 0.003 piece/mm² but not more than 0.04 piece/mm².

According to this embodiment, the circumferential grooves 4 and the lateral grooves 5 are provided on the respective outer sides of the block group $G_B$ in the tread width direction, whereby it is possible to further improve the water evacuation property as compared with the tire according to the embodiment illustrated in FIG. 1.

Figure 14:
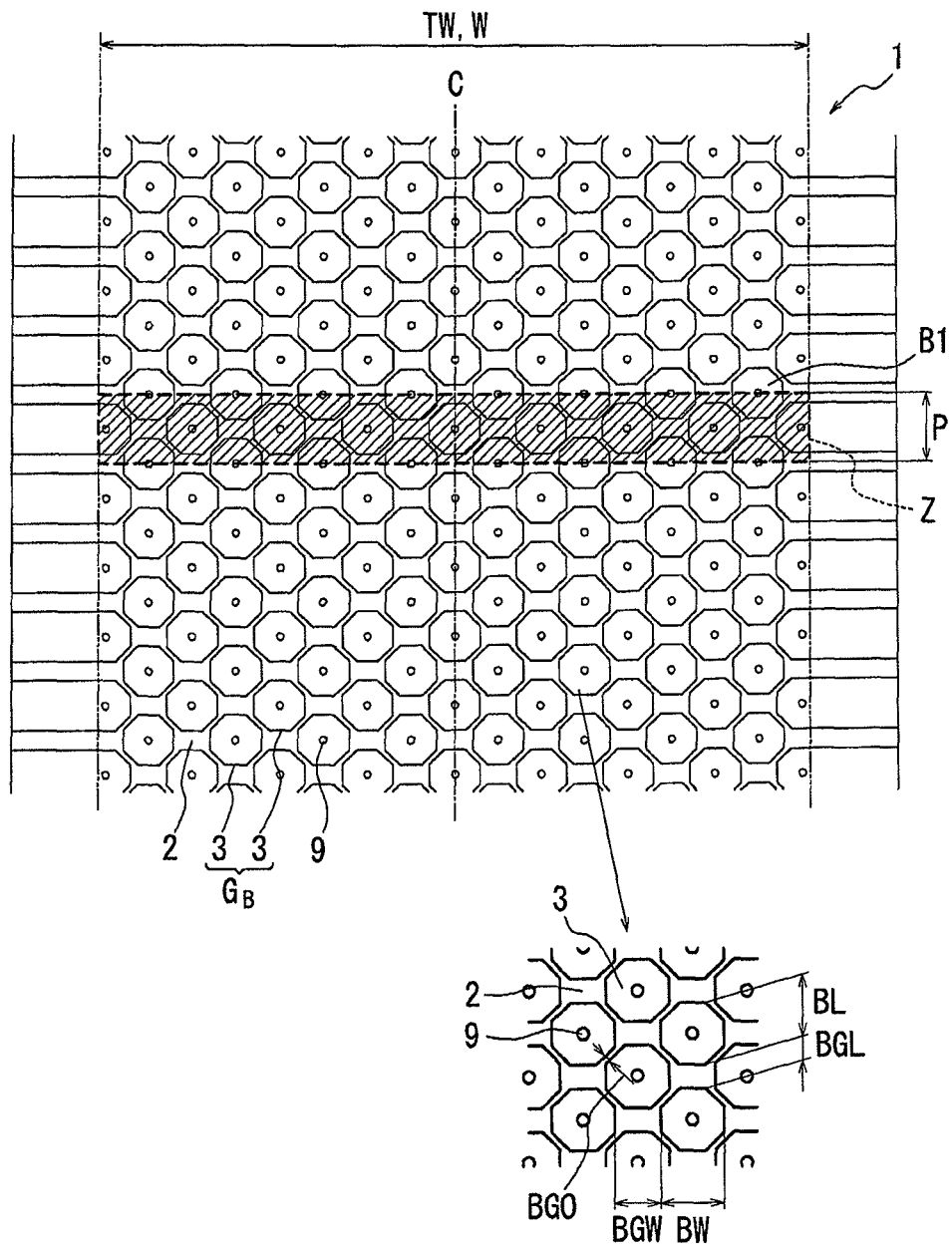
FIG. 14 is a partial development view illustrating a tread pattern of a pneumatic tire (tire of Example 8) according to another embodiment of the present invention.

FIG. 14 is a development view illustrating a tread pattern of a tire according to still another embodiment of the present invention. In the tire illustrated in FIG. 14, each of the blocks 3 of the block group $G_B$ has a small hole 9 circularly opened on the tread surface and having a predetermined depth. The small hole 9 takes in water on a road surface when the surface of the block 3 is brought into contact with the road surface, and discharges the taken-in water by centrifugal force generated by rotation of the tire. Further, the periphery of the small hole 9 functions as an edge. Therefore, by providing the small hole 9 to each of the blocks 3, it is possible to enhance the water evacuation property and the edge effect while suppressing the decrease in the block rigidity as compared with a case where the sipe is provided to the block 3.

It should be noted that, although the number of the small hole 9 provided to each of the blocks is one in the embodiment illustrated in FIG. 1, the number is not limited to this. It may be possible to vary the number of the small hole, for example, to be two or four as is the case with the tire according to the other embodiment of the present invention illustrated in FIGS. 2 and 3, through adjustment of the block rigidity, the required water evacuation property and the length of the edge.

More specifically, it is preferable that the block number density S is in a range of not less than 0.003 piece/mm$^2$ but not more than 0.01 piece/mm$^2$ and the number of the small holes provided to each of the blocks 3 is two or more, in a case where the relatively large blocks 3 are required to be formed in order to maintain a balance with, for example, the driving stability, wear resistance and the other properties. With this configuration, it is possible to obtain higher water evacuation property, edge effect and the like while keeping the balance with the other properties. On the other hand, it is preferable that the block number density S is in a range of not less than 0.004 piece/mm$^2$ but not more than 0.04 piece/mm$^2$ and the number of the small holes provided to each of the blocks 3 is one, in a case where the relatively small blocks 3 are required to be formed in order to maintain a balance with the other properties similar to the case described above. With this configuration, it is possible to obtain the higher block rigidity while keeping the balance with the other properties.

Further, although the opening portion of the small hole 9 is formed in a circular shape in the illustrated example, the shape of said opening portion is not limited to this, and it is possible to form it in an elliptic shape, polygonal shape, or irregular closed shape. Note that, from the viewpoint of enhancing the water evacuation property in the central zone of the block, it is preferable that the small hole 9 is provided at the center of the block as much as possible. In the present invention, it is not necessary to provide the small hole 9 to all of the blocks 3, and a predetermined effect can be obtained only by providing the small hole to plural blocks 3. It is preferable that the small hole 9 is provided to not less than half of the blocks 3 in each block group in a case where higher water evacuation, edge effect and the like are required.

Further, it is preferable for the diameter of the opening portion of the small hole 9 to be in a range of 0.5 mm to 3.5 mm. This is because, in a case where the diameter of the opening portion is less than 0.5 mm, there is a possibility that both the water-absorbing effect and the edge effect cannot be sufficiently achieved and hence the desired improvement in the performances on ice cannot be obtained; and, on the other hand, in a case where the diameter of the opening portion exceeds 3.5 mm, although the water-absorbing effect improves, the ground contact area decreases at the time of applying the edge effect, and hence, there is a possibility that the desired improvement in the performances on ice cannot be obtained. Note that it is possible to keep the balance between the performance on ice and the other performances by adjusting the ground contact area and the block rigidity such that the number of the small holes 9 provided to the blocks 3 increases when the diameter of the opening portion of each of the small holes 9 is small, while the number of the small holes 9 provided to the blocks 3 decreases when the diameter of the opening portion of each of the small holes 9 is large.

Further, it is preferable for the depth of the small hole 9 to be in the range of 5% to 100% of the height of the block to which said small hole 9 is provided. This is because, in a case where the depth of the small hole 9 is less than 5% of the height of the block, the volume of the small hole 9 is undesirably small, and hence a sufficient water-absorbing effect cannot be obtained, making it impossible to obtain the sufficient improvement in the performance on ice. Further, when the wear progresses on the tread surface, the small hole 9 vanishes earlier, and hence, it is difficult to maintain the predetermined performances. On the other hand, in a case where the depth of the small hole 9 exceeds 100% of the height of the block, although the water-absorbing effect can be sufficiently secured, there is a possibility that the driving performance deteriorates on the dried road surface and the wet road surface due to the reduction in the rigidity of the block 3, or, the water taken in the small hole 9 at the time when the tread surface is brought into contact with the road surface cannot be discharged completely from the small hole 9 by the centrifugal force at the time of rotation of the tire, and the water-absorbing effect deteriorates in the process of the rotation of the tire.

Example

Next, tires of Examples 1 to 10 according to the present invention, a tire of Conventional Example 1 according to the conventional technique, and tires of Comparative Examples 1 to 6 are prepared, and performance evaluations regarding a performance on ice and the like is made on the tires, which will be described below. Note that the sample tires are radial tires for passenger vehicle with a size of 205/55R16.

The tires of Examples 1 to 6 have, on tread portions thereof, tread patterns illustrated in FIGS. 1 to 6. Each of these tires has, on the entire tread portion, a block group $G_B$ formed such that plural independent blocks defined by grooves are arranged so as to be close to each other. The outer shape of the surface of each of the blocks is a regular octagon, and Table 1 shows the length BL (mm) of the block in the tread circumference direction, the length BW (mm) thereof in the tread width direction, the height (height from the groove bottom) BH (mm) thereof, the distance BGL (mm) between the blocks adjacent to each other in the tread circumferential direction, the distance BGW (mm) between the blocks adjacent to each other in the tread width direction, and the distance BGO (mm) between the blocks adjacent to each other in a direction diagonal to the tread circumferential direction. Further, Table 1 shows features of each of the tires, which include: a reference pitch length P (mm) of a block; a width W (mm) of a block group $G_B$; a negative ratio N (%) of a reference zone Z of the block group $G_B$, the reference zone Z being defined by the reference pitch length P of the block and the width W of the block group; the number a (piece) of the blocks existing in the reference zone Z; a block number density S (piece/mm$^2$) per unit actual ground contact area of the block group; and, the number (line) of block lines counted in the tread width direction in the block group $G_B$.

The tire of Example 7 has a tread portion with a tread pattern illustrated in FIG. 7. In this tire, the block group $G_B$ is disposed on a part of the tread portion, and in particular, exists at both sides of an equatorial plane C within an area of 54% of the tread ground contact width TW. The outer shape of the surface of each of the blocks is a regular octagon. At both outer sides of the block group $G_B$ in the tread width direction, there are provided circumferential grooves extending along the tread circumferential direction. Further, at the outer side of each of said circumferential grooves in the tread width direction, lateral grooves extending in the tread width direction are provided at a circumferential length interval of two blocks of the block group $G_B$, and shoulder blocks are defined by said lateral grooves. In each of the formed shoulder blocks, there are provided six sipes each running in the tread width direction. Each of the circumferential grooves has dimensions of: a groove width of 9.4 mm, and a groove depth of 8.9 mm. Each of the lateral grooves has dimensions of: a groove width of 7.5 mm, and a groove depth of 8.9 mm.

Figure 15:
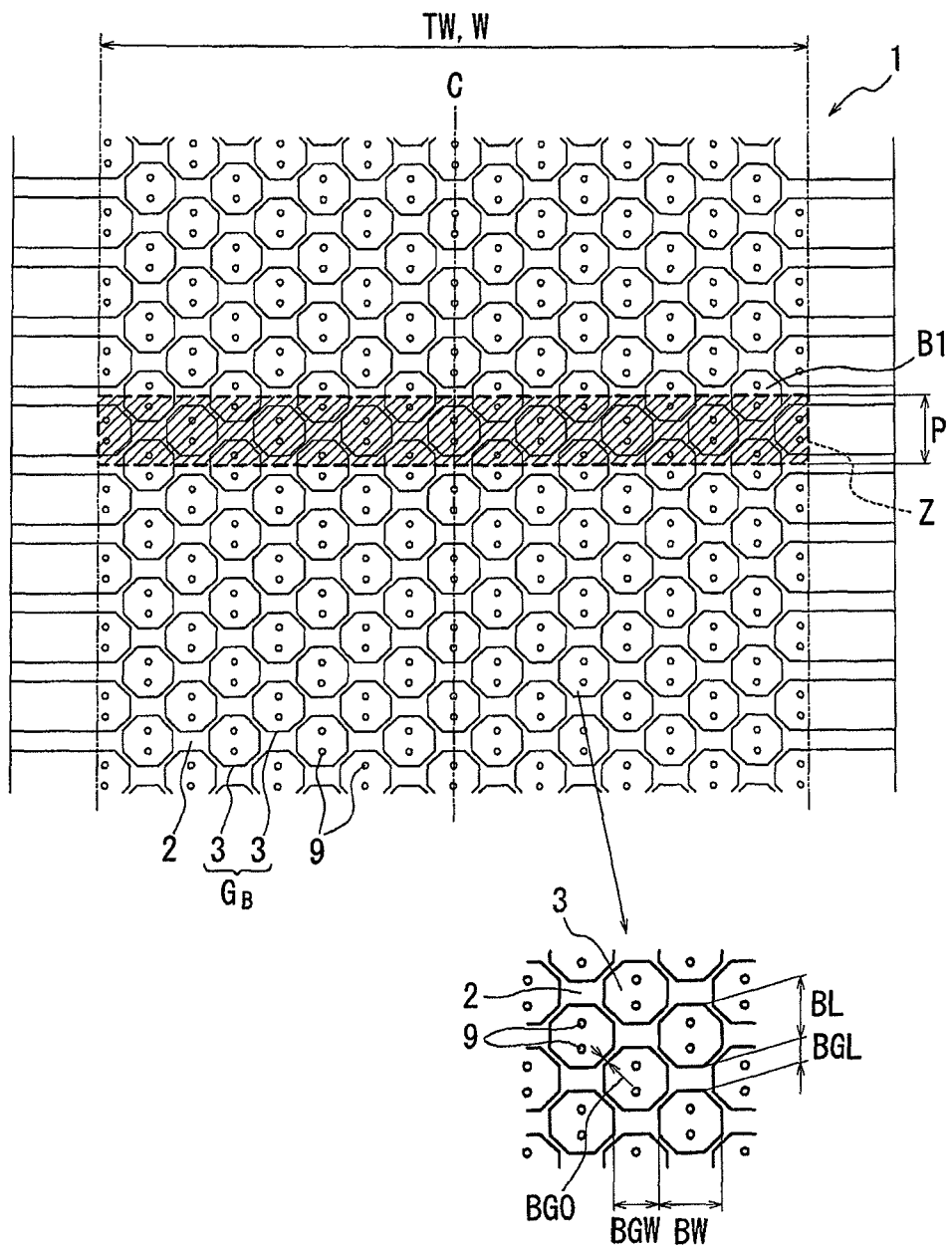
FIG. 15 is a partial development view illustrating a tread pattern of a pneumatic tire (tire of Example 9) according to another embodiment of the present invention.
Figure 16:
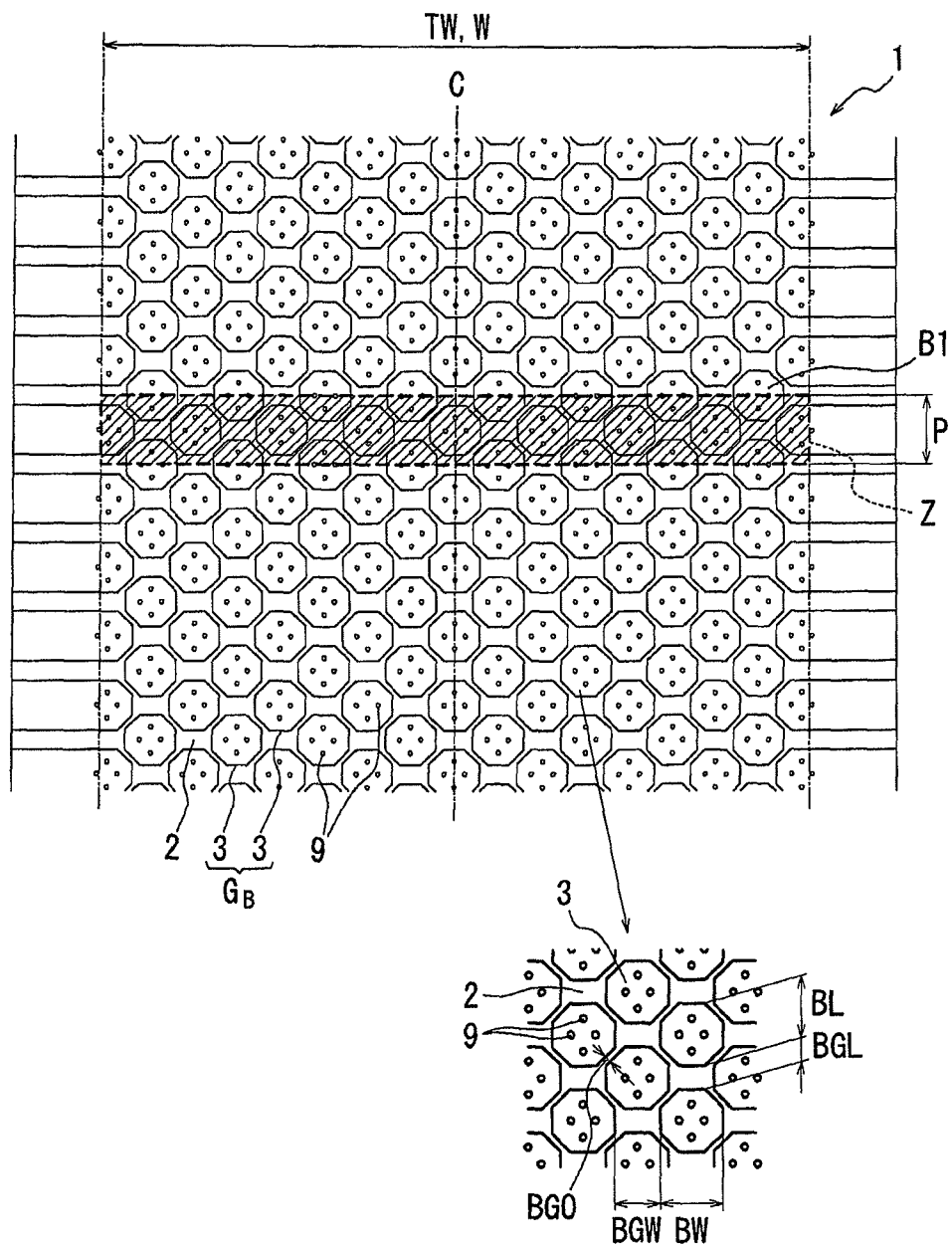
FIG. 16 is a partial development view illustrating a tread pattern of a pneumatic tire (tire of Example 10) according to another embodiment of the present invention.

The tires of Examples 8 to 10 have tread portions with tread patterns illustrated in FIGS. 14 to 16. These tires have, for each block in the block group, one or more circular small holes opening in the tread surface, the characteristics of which tires are also shown in Table 1.

Figure 8:
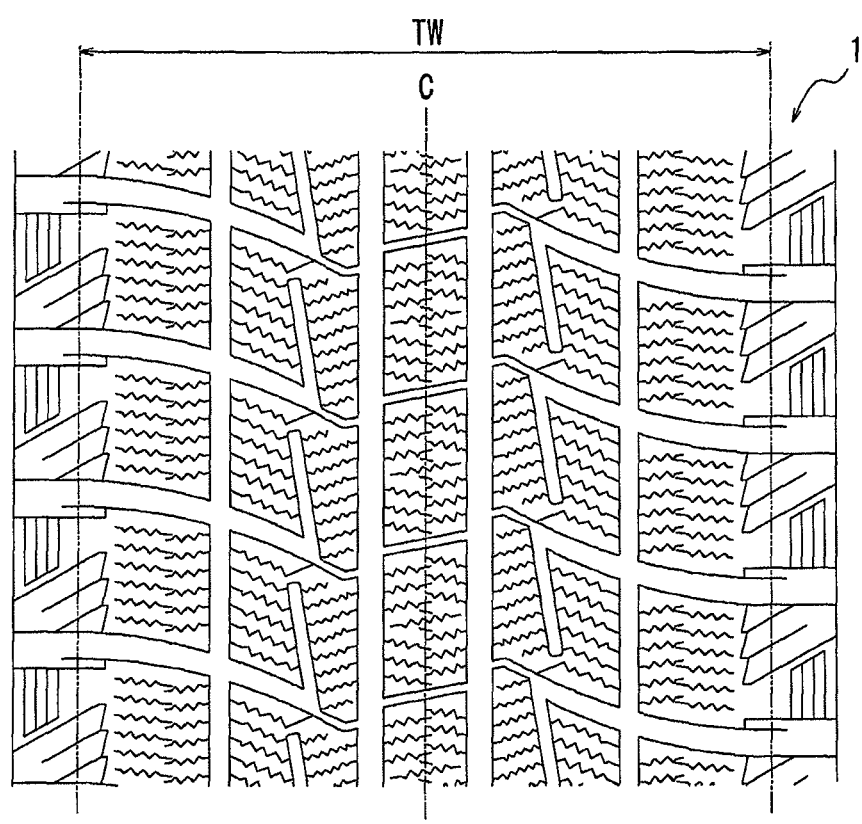
FIG. 8 is a partial development view illustrating a tread pattern of a conventional pneumatic tire (tire of Conventional Example 1).

For comparison purpose, the tire of Comparative Example 1 is also prepared, which has a tread pattern illustrated in FIG. 8 whose negative ratio of the entire tread portion is almost the same as that of the tire of Example 3. The tire of Conventional Example 1 has, on the tread portion, four circumferential grooves extending in the tread circumferential direction, and rib-shaped land portion adjacent thereto (in the order of a center land portion, middle land portions, and shoulder land portions from the center in the tread width direction). Two circumferential grooves located at the inner side in the tread width direction have a width of 8 mm and a depth of 8.9 mm, and two circumferential grooves located at the outer side in the tread width direction have a width of 6 mm and a depth of 8.9 mm. In the center land portion, the middle land portions and the shoulder land portions, blocks are defined by lateral grooves obliquely extending in the tread circumferential direction, and in each of the blocks, a large number of sipes extending in a zigzag manner are formed. The number of the sipes is 12 to 14 for each of the blocks, and the length of each of the sipes is in a range of 4.2 to 4.7 mm. Table 2 shows the dimensions of the blocks and other characteristics.

Further, for comparison purpose, the tires of Comparative Examples 1 to 4 are also prepared, which have, on the tread portion, tread patterns illustrated in FIGS. 9 to 12. In the tire of Comparative Examples 1 to 4, the block number density S falls outside the range of 0.003 to 0.04 piece/mm$^2$. Table 2 shows the characteristics of the tires of the respective Comparative Examples.

Figure 17:
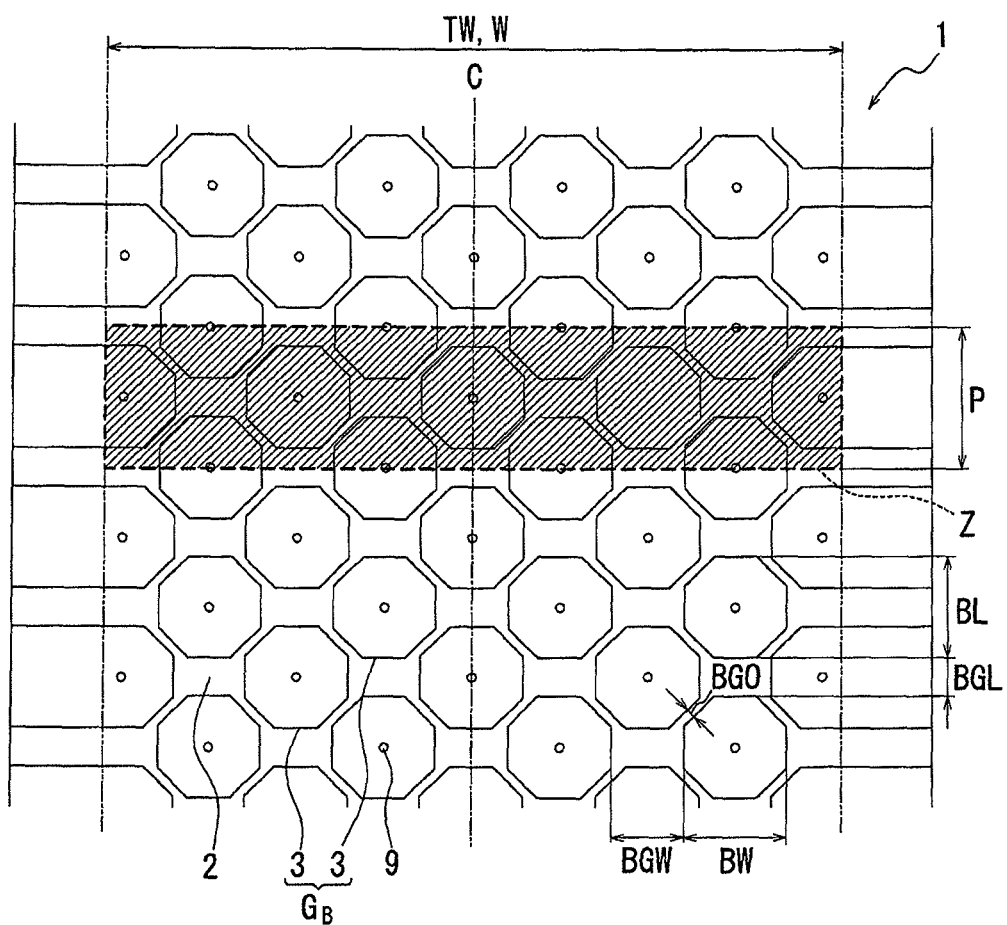
FIG. 17 is a partial development view illustrating a tread pattern of a comparative pneumatic tire (tire of Comparative Example 5).
Figure 18:
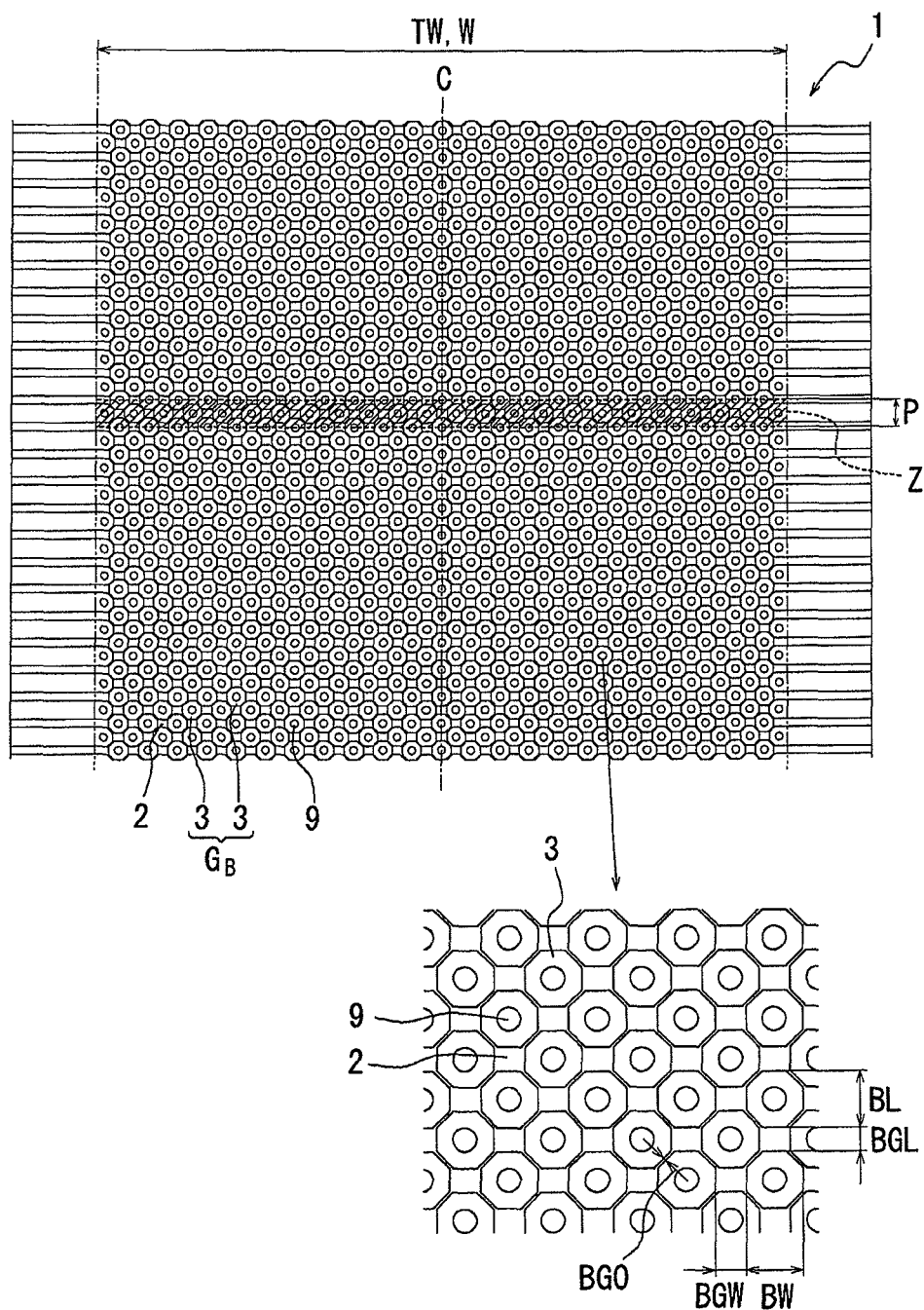
FIG. 18 is a partial development view illustrating a tread pattern of a comparative pneumatic tire (tire of Comparative Example 6).

Yet further, for comparison purpose, the tires of Comparative Examples of 5 and 6 are also prepared, which have, on the tread portion, tread patterns illustrated in FIGS. 17 and 18. In the tires of Comparative Examples 5 and 6, a circular small hole opening in the tread surface is provided for each of the blocks of the block group, and the block number density S falls outside the range of 0.003 to 0.04 piece/mm$^2$. Table 2 shows the characteristics of the tires of the respective Comparative Examples.

TABLE 1

Figure 2:
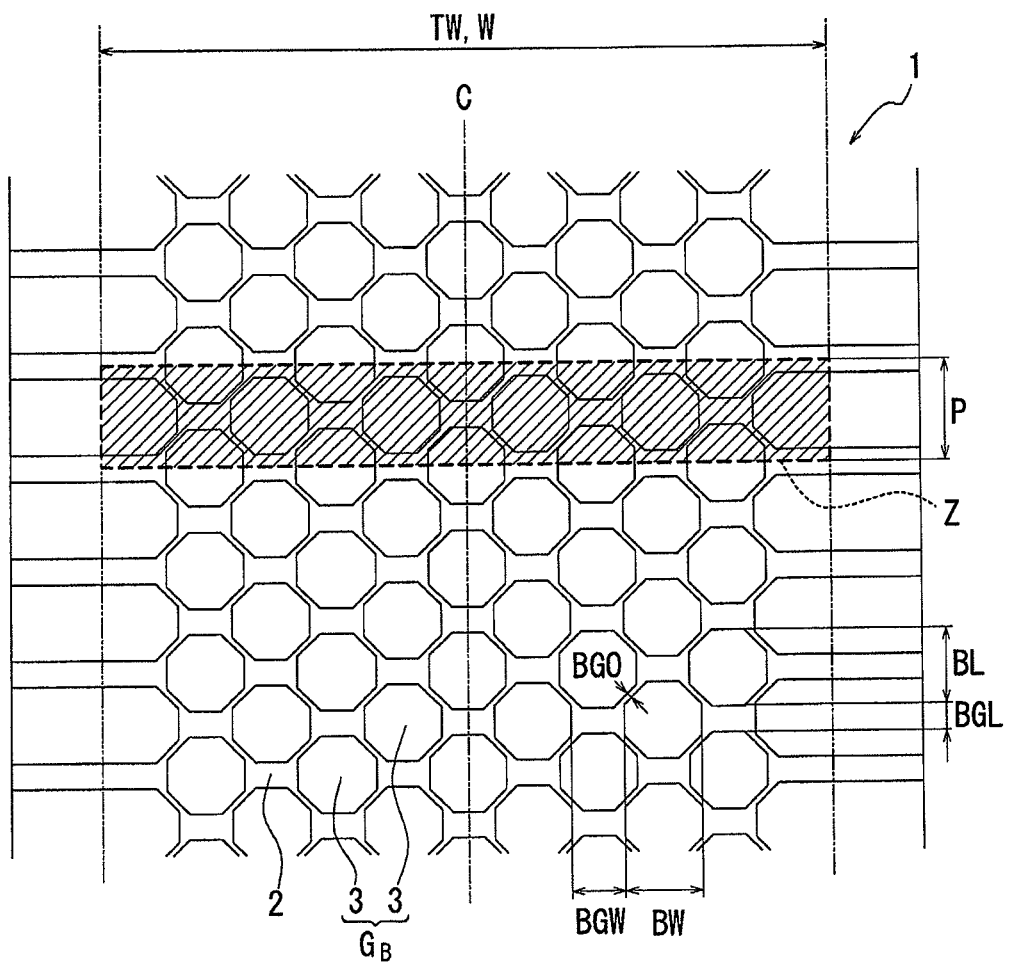
FIG. 2 is a partial development view illustrating a tread pattern of a pneumatic tire (tire of Example 1) according to another embodiment of the present invention.
Figure 3:
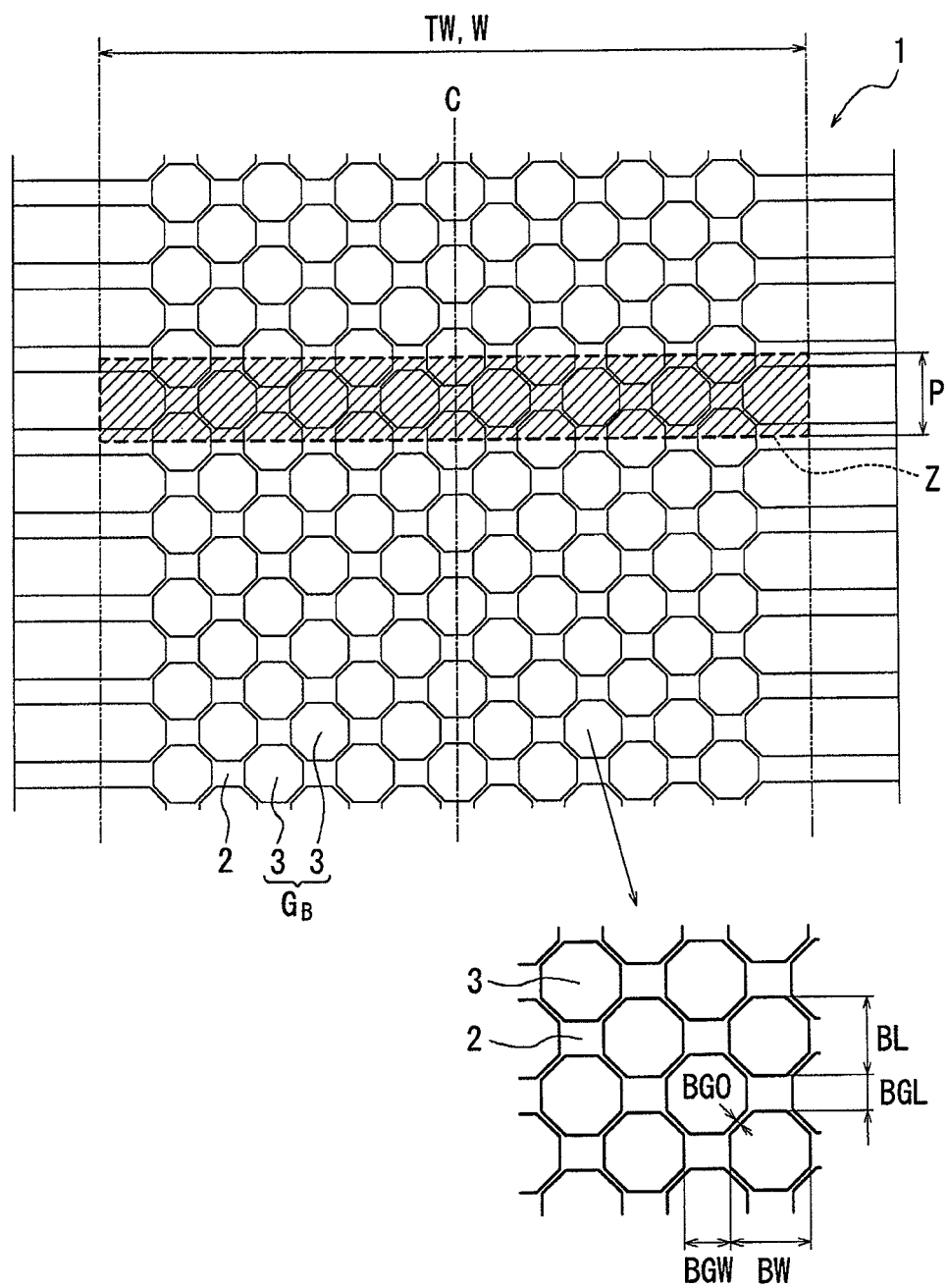
FIG. 3 is a partial development view illustrating a tread pattern of a pneumatic tire (tire of Example 2) according to another embodiment of the present invention.
Figure 4:
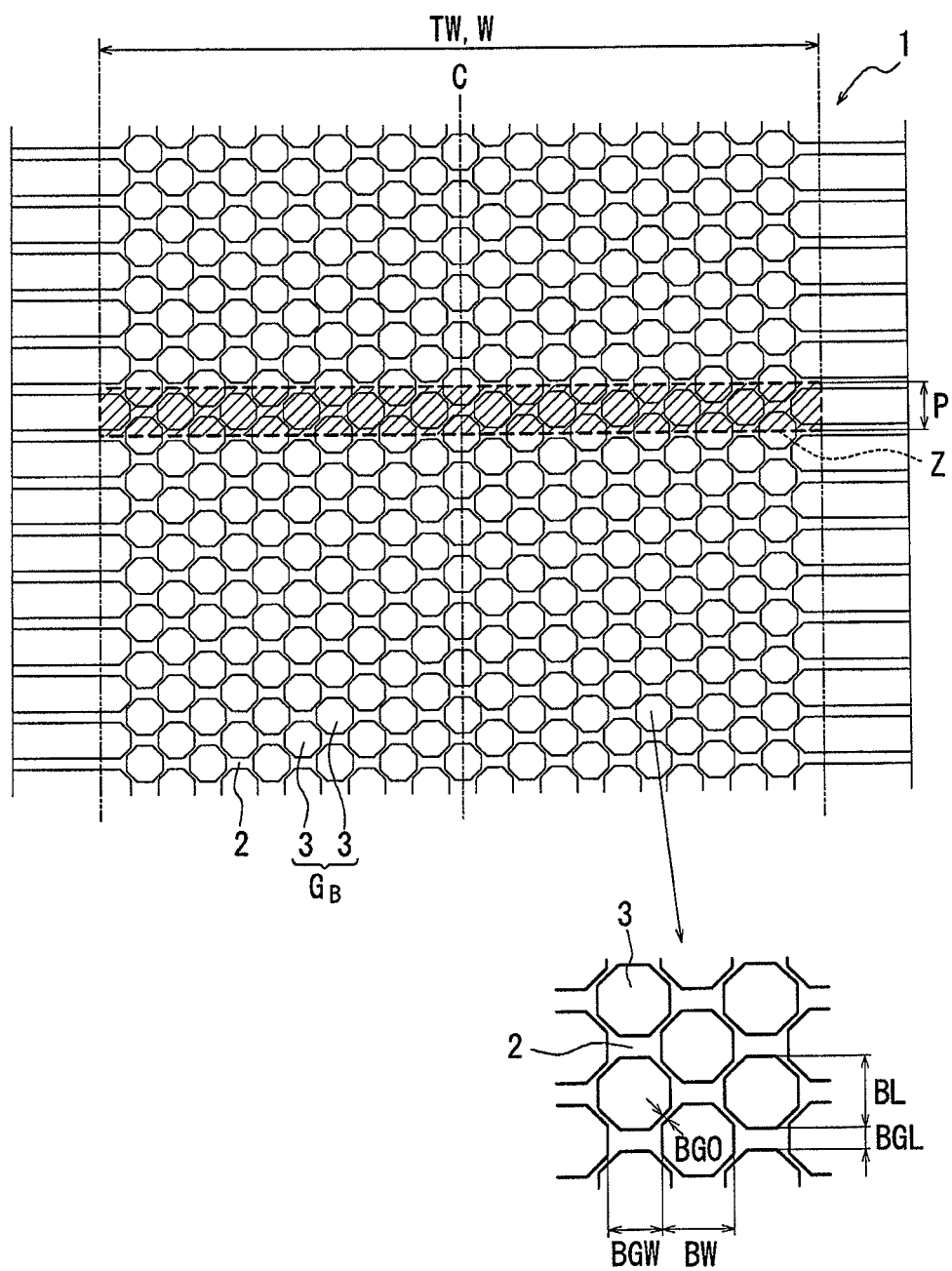
FIG. 4 is a partial development view illustrating a tread pattern of a pneumatic tire (tire of Example 4) according to another embodiment of the present invention.
Figure 5:
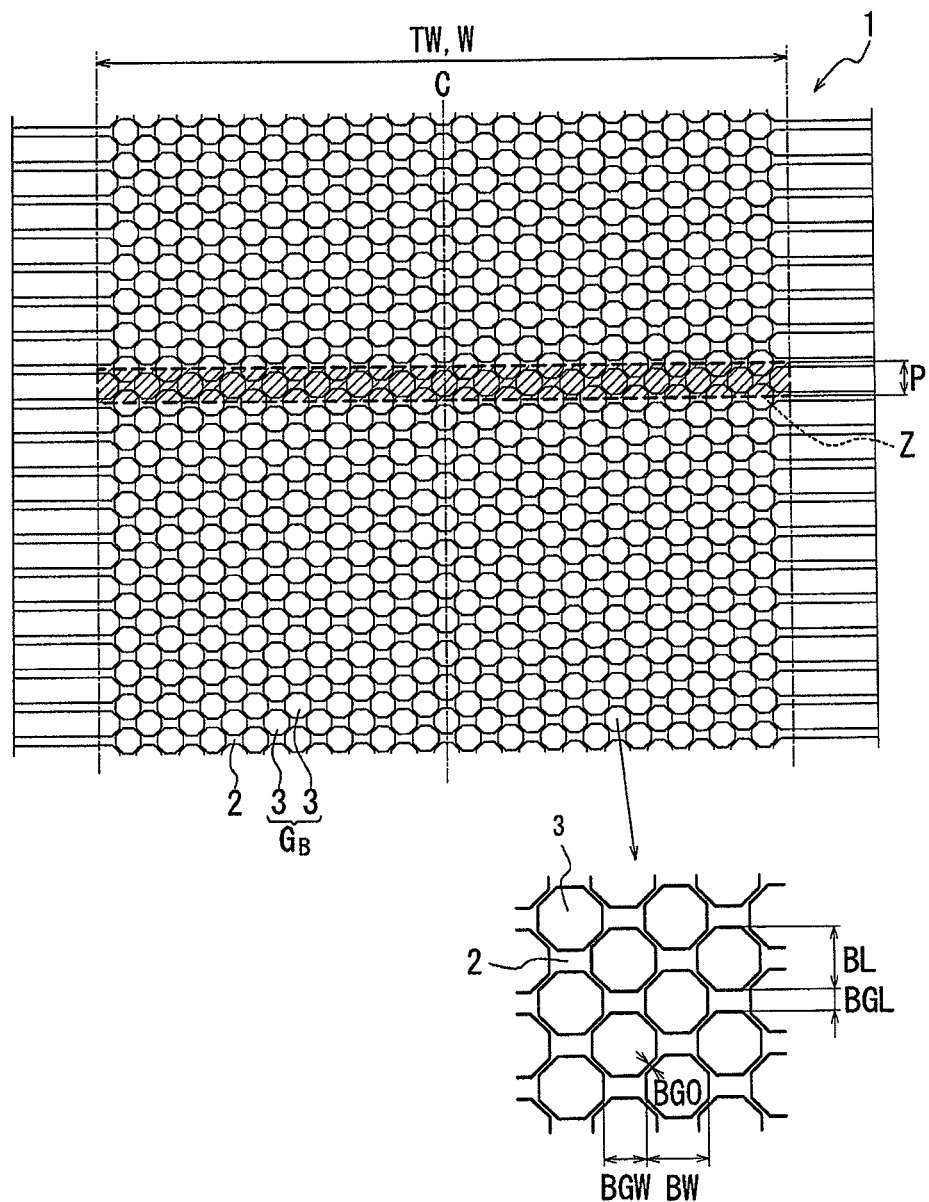
FIG. 5 is a partial development view illustrating a tread pattern of a pneumatic tire (tire of Example 5) according to another embodiment of the present invention.
Figure 6:
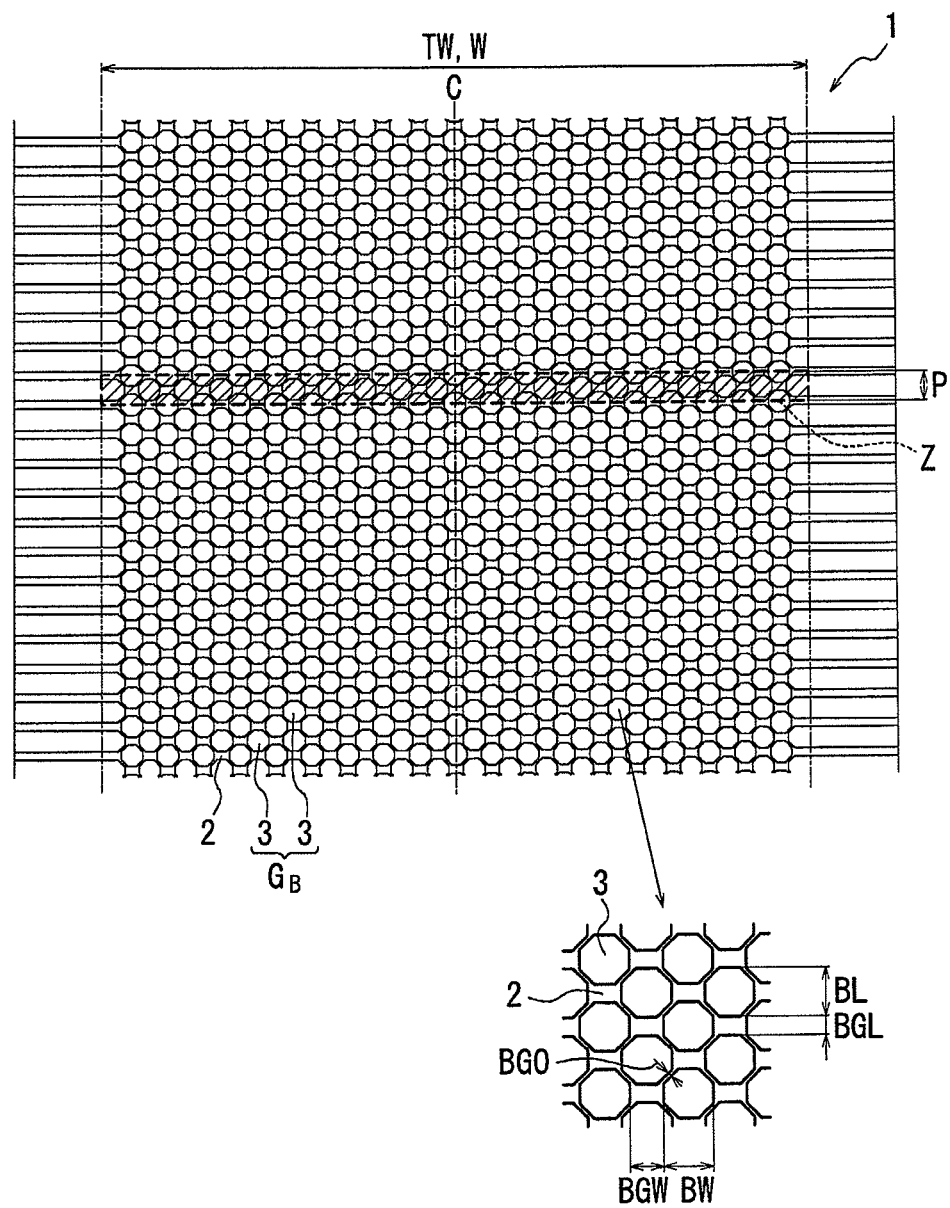
FIG. 6 is a partial development view illustrating a tread pattern of a pneumatic tire (tire of Example 6) according to another embodiment of the present invention.

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Tread pattern | FIG. 2 | FIG. 3 | FIG. 1 | FIG. 4 | FIG. 5 | FIG. 6 | FIG. 7 | FIG. 14 | FIG. 15 | FIG. 16 |
| Tread ground contact width TW (mm) | 190 | 190 | 190 | 190 | 190 | 190 | 190 | 190 | 190 | 190 |
| Circumferential length of block BL (mm) | 19.8 | 15.0 | 13.5 | 9.3 | 6.7 | 5.6 | 13.5 | 13.5 | 13.5 | 13.5 |
| Widthwise length of block BW (mm) | 19.8 | 15.0 | 13.5 | 9.3 | 6.7 | 5.6 | 13.5 | 13.5 | 13.5 | 13.5 |
| Distance between blocks BGL (mm) | 6.0 | 6.5 | 4.5 | 2.7 | 2.3 | 2.0 | 4.5 | 4.5 | 4.5 | 4.5 |
| Distance between blocks BGW (mm) | 14.3 | 9.3 | 9.8 | 7.4 | 4.9 | 4.1 | 9.8 | 9.8 | 9.8 | 9.8 |
| Distance between blocks BGO (mm) | 1.15 | 1.21 | 1.1 | 0.86 | 0.6 | 0.5 | 1.1 | 1.1 | 1.1 | 1.1 |
| Block height (mm) | 8.5 | 8.5 | 8.5 | 8.0 | 6.0 | 5.0 | 8.5 | 8.5 | 8.5 | 8.5 |
| Reference pitch length P (mm) | 25.8 | 21.5 | 18.0 | 12.0 | 9.0 | 7.6 | 18.0 | 18.0 | 18.0 | 18.0 |
| Block group width W (mm) | 190 | 190 | 190 | 190 | 190 | 190 | 102.8 | 190 | 190 | 190 |
| Negative ratio of block group (%) | 25.81 | 28.9 | 27.9 | 28.4 | 29.0 | 29.1 | 27.8 | 27.93 | 27.93 | 27.93 |
| Number of block lines (lines) | 11 | 15 | 17 | 23 | 33 | 39 | 9 | 17 | 17 | 17 |
| Number of blocks a (piece) | 11 | 15 | 17 | 23 | 33 | 39 | 18 | 17 | 17 | 17 |
| Block number density (piece/mm$^2$) | 0.00302 | 0.00516 | 0.0069 | 0.0141 | 0.02717 | 0.03808 | 0.0067 | 0.0069 | 0.0069 | 0.0069 |
| Number of small hole (piece/block) | — | — | — | — | — | — | — | 1 | 2 | 4 |
| Diameter of small hole (mm) | — | — | — | — | — | — | — | 2 | 1.5 | 1 |
| Depth of small hole (mm) | — | — | — | — | — | — | — | 6.4 | 6.4 | 6.4 |

TABLE 2

Figure 9:
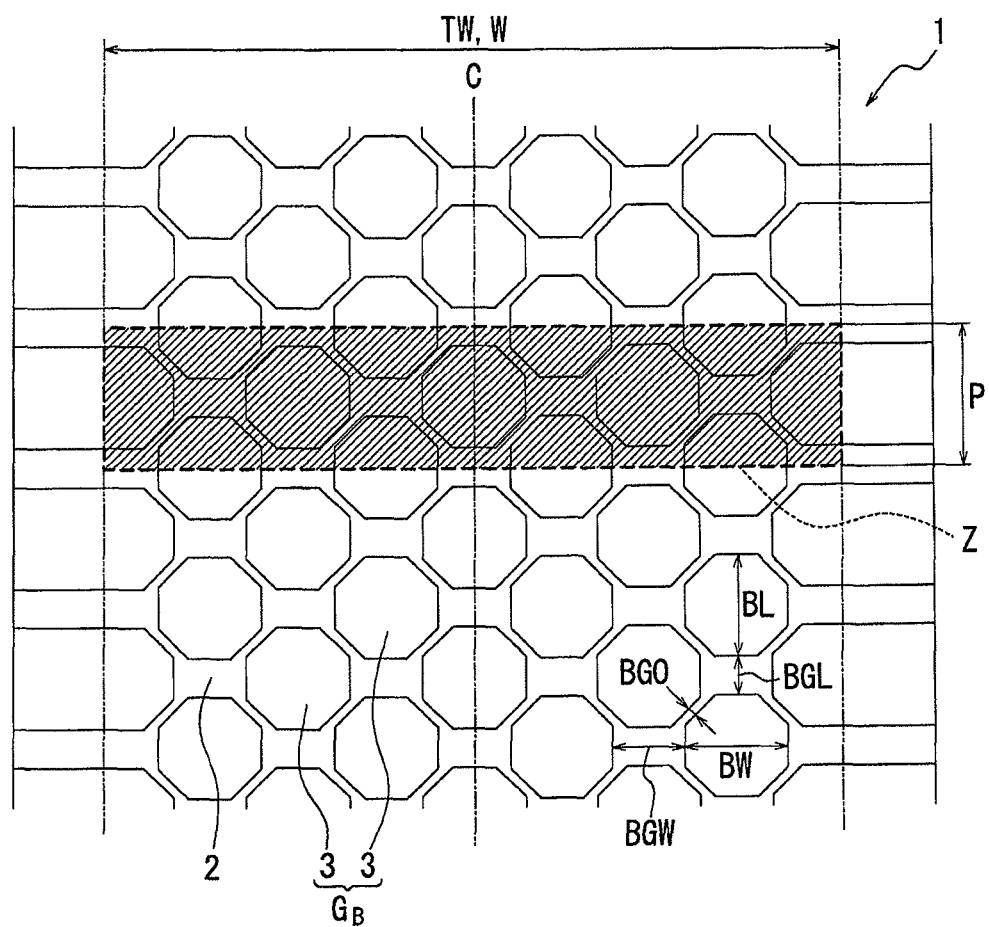
FIG. 9 is a partial development view illustrating a tread pattern of a comparative pneumatic tire (tire of Comparative Example 1).
Figure 10:
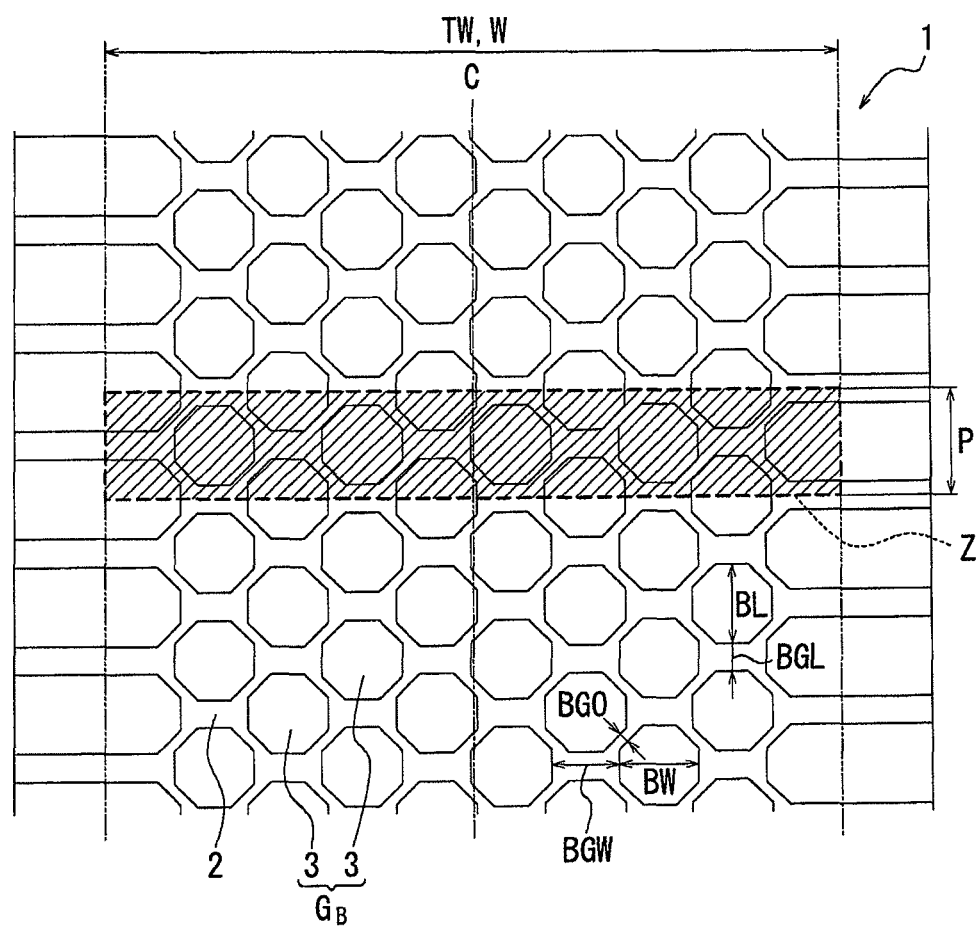
FIG. 10 is a partial development view illustrating a tread pattern of a comparative pneumatic tire (tire of Comparative Example 2).
Figure 11:
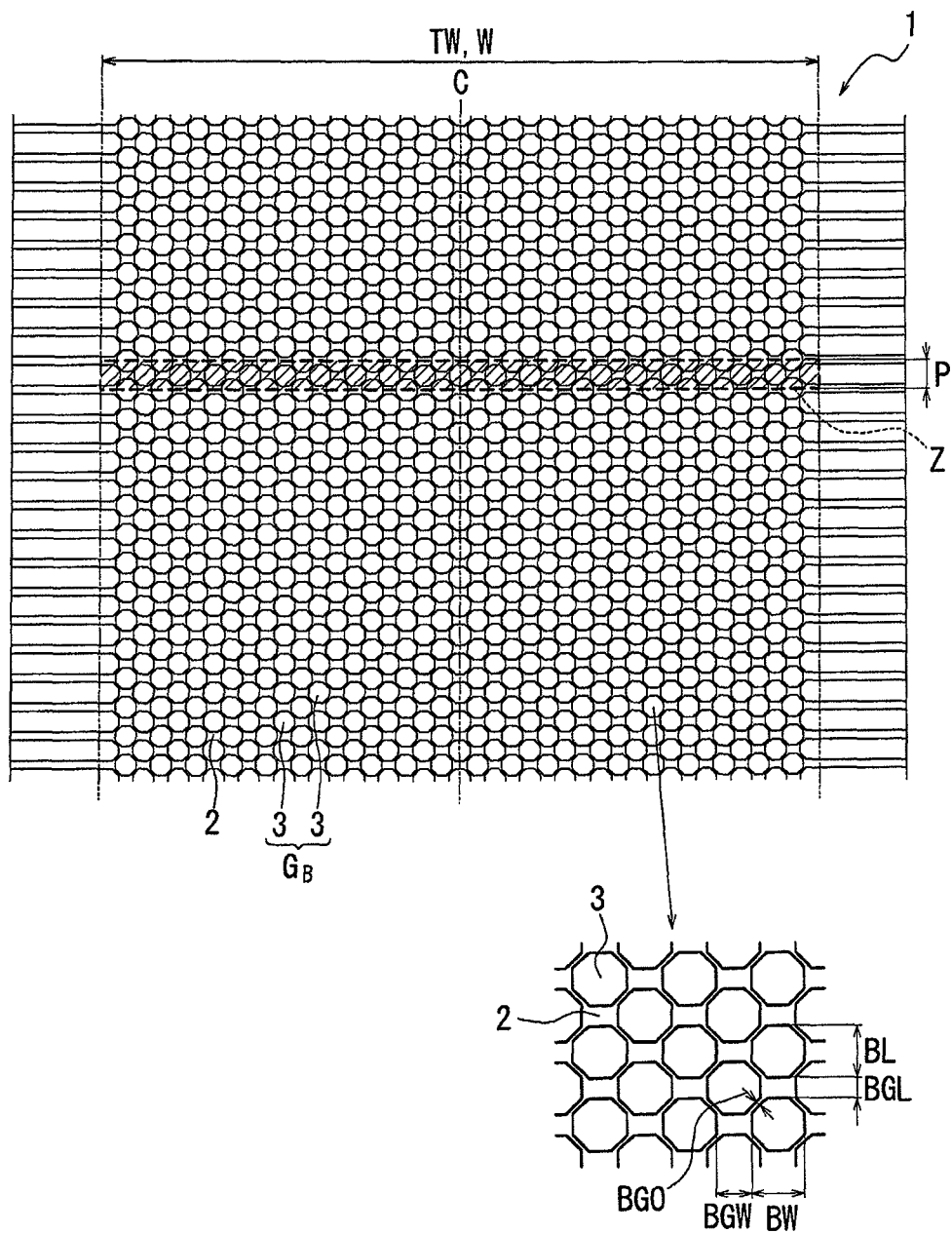
FIG. 11 is a partial development view illustrating a tread pattern of a comparative pneumatic tire (tire of Comparative Example 3).
Figure 12:
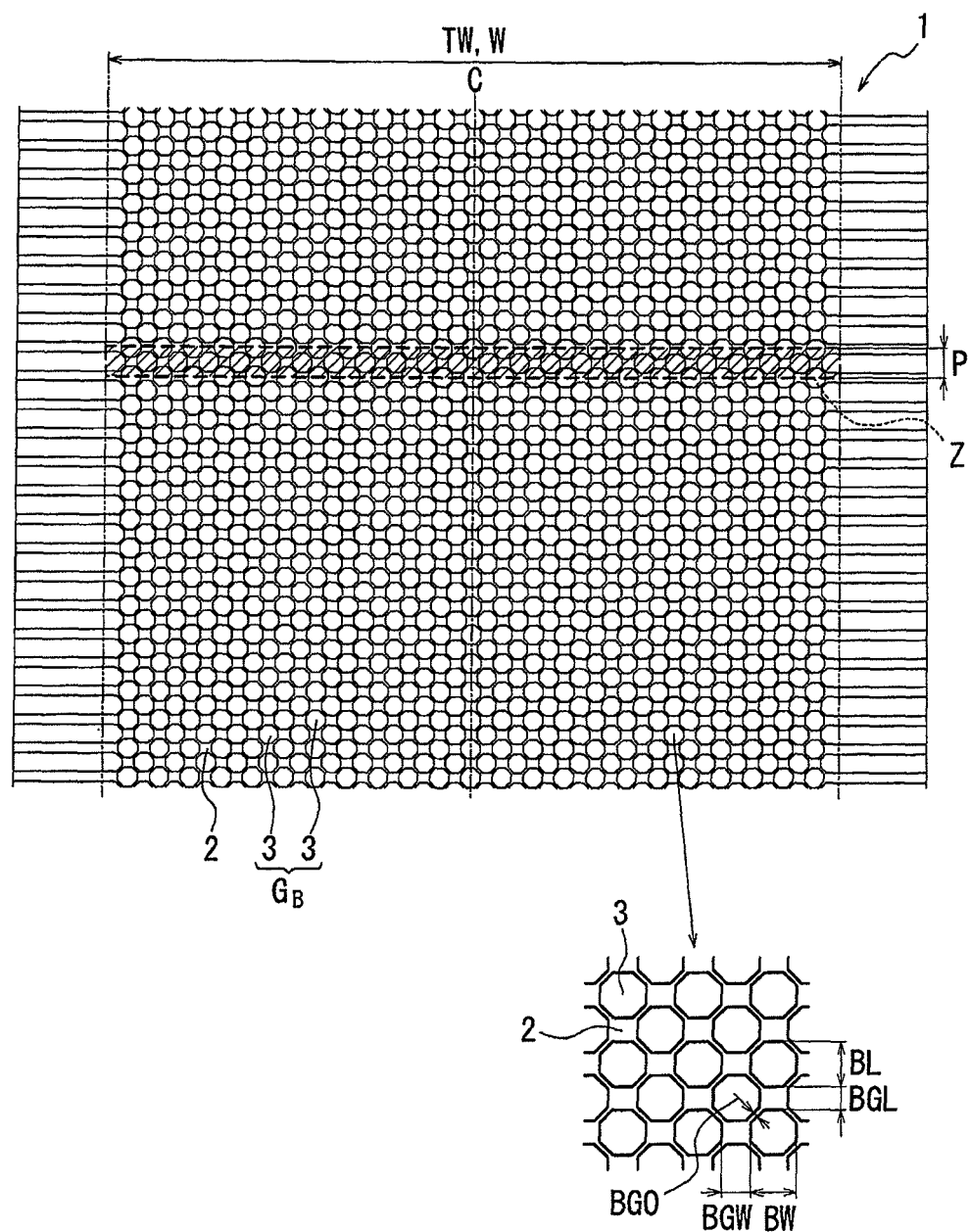
FIG. 12 is a partial development view illustrating a tread pattern of a comparative pneumatic tire (tire of Comparative Example 4).

|  | Conventional Example 1 | Comparative Example 1 | Comparative Example 2 | Comparative Example 3 | Comparative Example 4 | Comparative Example 5 | Comparative Example 6 |
|---|---|---|---|---|---|---|---|
| Tread pattern | FIG. 8 | FIG. 9 | FIG. 10 | FIG. 11 | FIG. 12 | FIG. 17 | FIG. 18 |
| Tread ground contact width TW (mm) | 190 | 190 | 190 | 190 | 190 | 190 | 190 |
| Circumferential length of block BL (mm) | min 33.0 to max 38.0 | 26.0 | 20.8 | 5.4 | 5.0 | 26.0 | 5.0 |
| Widthwise length of block BW (mm) | min 24.5 to max 36.7 | 26.0 | 20.8 | 5.4 | 5.0 | 26.0 | 5.0 |
| Distance between blocks BGL (mm) | min 2.5 to max 7.5 | 9.0 | 6.0 | 2.0 | 2.2 | 9.0 | 2.2 |

TABLE 2-continued

| | Conventional Example 1 | Comparative Example 1 | Comparative Example 2 | Comparative Example 3 | Comparative Example 4 | Comparative Example 5 | Comparative Example 6 |
|---|---|---|---|---|---|---|---|
| Distance between blocks BGW (mm) | — | 19.0 | 17.5 | 3.9 | 3.1 | 19.0 | 3.1 |
| Distance between blocks BGO (mm) | — | 2.3 | 2.2 | 0.5 | 0.4 | 2.3 | 0.4 |
| Block height (mm) | 8.5 | 8.5 | 8.5 | 5.0 | 5.0 | 8.5 | 5.0 |
| Reference pitch length P (mm) | 40.5 | 35.0 | 26.8 | 7.4 | 7.2 | 35.0 | 7.2 |
| Block group width W (mm) | (190) | 190 | 190 | 190 | 190 | 190 | 190 |
| Negative ratio of block group (%) | (29.0) | 28.8 | 29.4 | 29.6 | 28.8 | 28.8 | 28.8 |
| Number of block lines (lines) | 5 | 9 | 10 | 41 | 47 | 9 | 47 |
| Number of blocks a (piece) | 5 | 9 | 10 | 41 | 47 | 9 | 47 |
| Block number density (piece/mm$^2$) | 0.00092 | 0.0019 | 0.00278 | 0.04145 | 0.04824 | 0.0019 | 0.04824 |
| Number of small hole (piece/block) | — | — | — | — | — | 1 | 1 |
| Diameter of small hole (mm) | — | — | — | — | — | 2 | 2 |
| Depth of small hole (mm) | — | — | — | — | — | 6.5 | 3.8 |

[Performance Evaluation]

Each of the sample tires described above is assembled with a rim having a size of 6.5 J×16 at an inner pressure of 220 kPa (relative pressure), and is mounted to a vehicle. Then, the following tests are made to make performance evaluation.

(1) Evaluation Test on Braking Performance on Ice

For the braking performance on ice, braking distances are measured at the time of full braking from a speed of 20 km/h on an ice-covered road, and evaluation is made on the basis of the measured distances. The evaluation results are shown in Tables 3 and 4, and FIG. 13. In Table 3, Table 4 and FIG. 13, the evaluations for the tires of Examples 1 to 10 and Comparative Examples 1 to 6 are indicated as index values with the results of the tire of Conventional Example 1 being set to 100. The larger value represents the better braking performance on ice.

(2) Evaluation Test on Driving Performance on Ice

For the driving performance on ice, times until a distance reaches 20 m are measured under the full acceleration on an ice covered road, and evaluation is made on the basis of the measured times. The evaluation results are shown in Tables 3 and 4, and FIG. 13. In Table 3, Table 4 and FIG. 13, the evaluations for the tires of Examples 1 to 10 and Comparative Examples 1 to 6 are indicated as index values with the results of the tire of Conventional Example 1 being set to 100. The larger value represents the better driving performance on ice.

(3) Evaluation Test on Driving Stability on Ice

For driving stability on ice, feeling evaluation is made comprehensively on the braking performance, acceleration performance, straight traveling performance and cornering performance by a test driver at the time of traveling under various traveling modes on a test course whose road surface is covered with ice. The evaluation results are shown in Tables 3 and 4, and FIG. 13. In Table 3, Table 4 and FIG. 13, the evaluations for the tires of Examples 1 to 10 and Comparative Examples 1 to 6 are indicated as index values with the results of the tire of Conventional Example 1 being set to 100. The larger value represents the better driving stability on ice.

(4) Evaluation Test on Quietness (Pattern Noise)

For quietness of the tires, feeling test is made on the quietness by a test driver at the time of traveling under various traveling modes on a general road in a dried state. The evaluation results are shown in Tables 3 and 4, and FIG. 13. In Table 3, Table 4 and FIG. 13, the evaluations for the tires of Examples 1 to 7 and Comparative Examples 1 to 4 are indicated as index values with the results of the tire of Conventional Example 1 being set to 100. The larger value represents the better quietness.

(5) Evaluation Test on Water Evacuation Property

For a water evacuation property, measurement is made on a limit speed at which hydroplaning occurs at the time of traveling straight on a wet road having a water depth of 5 mm, and evaluation is made on the basis of the measured limit speed. The evaluation results are shown in Tables 3 and 4, and FIG. 13. In Table 3, Table 4 and FIG. 13, the evaluations for the tires of Examples 1 to 7 and Comparative Examples 1 to 4 are indicated as index values with the results of the tire of Conventional Example 1 being set to 100. The larger value represents the better water evacuation property.

(6) Evaluation Test on Driving Stability on Dried Road Surface

For the tires of Conventional Example 1, Example 3, Examples 8 to 10 and Comparative Examples 5 and 6, driving stability on a dried road surface is evaluated. For the driving stability on the dried road surface, feeling evaluation is made comprehensively on the braking performance, acceleration performance, straight traveling performance and cornering performance by a test driver at the time of traveling in a sporty manner under various traveling modes on a circuit course in a dried state. The evaluation results are shown in Tables 3 and 4. In Table 3 and Table 4, the evaluation results are indicated as index values with the results of the tire of Conventional Example 1 being set to 100. The larger value represents the better driving stability on the dried road surface.

TABLE 3

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Braking performance on ice | 125 | 130 | 140 | 130 | 125 | 110 | 125 | 142 | 143 | 145 |
| Driving performance on ice | 110 | 125 | 135 | 140 | 120 | 105 | 108 | 137 | 139 | 140 |
| Driving stability (iced road surface) | 105 | 115 | 130 | 130 | 110 | 103 | 115 | 123 | 125 | 126 |
| Quietness | 104 | 109 | 115 | 121 | 125 | 131 | 110 | — | — | — |
| Water evacuation property | 97 | 97 | 95 | 93 | 92 | 92 | 105 | — | — | — |
| Driving stability (dried road surface) | — | — | 110 | — | — | — | — | 108 | 106 | 103 |

TABLE 4

|  | Conventional Example 1 | Comparative Example 1 | Comparative Example 2 | Comparative Example 3 | Comparative Example 4 | Comparative Example 5 | Comparative Example 6 |
|---|---|---|---|---|---|---|---|
| Braking performance on ice | 100 | 95 | 105 | 100 | 97 | 102 | 95 |
| Driving performance on ice | 100 | 92 | 98 | 95 | 96 | 99 | 96 |
| Driving stability (iced road surface) | 100 | 90 | 95 | 95 | 95 | 94 | 96 |
| Quietness | 100 | 95 | 97 | 135 | 137 | — | — |
| Water evacuation property | 100 | 95 | 96 | 90 | 90 | — | — |
| Driving stability (dried road surface) | 100 | — | — | — | — | 120 | 80 |

Figure 13:
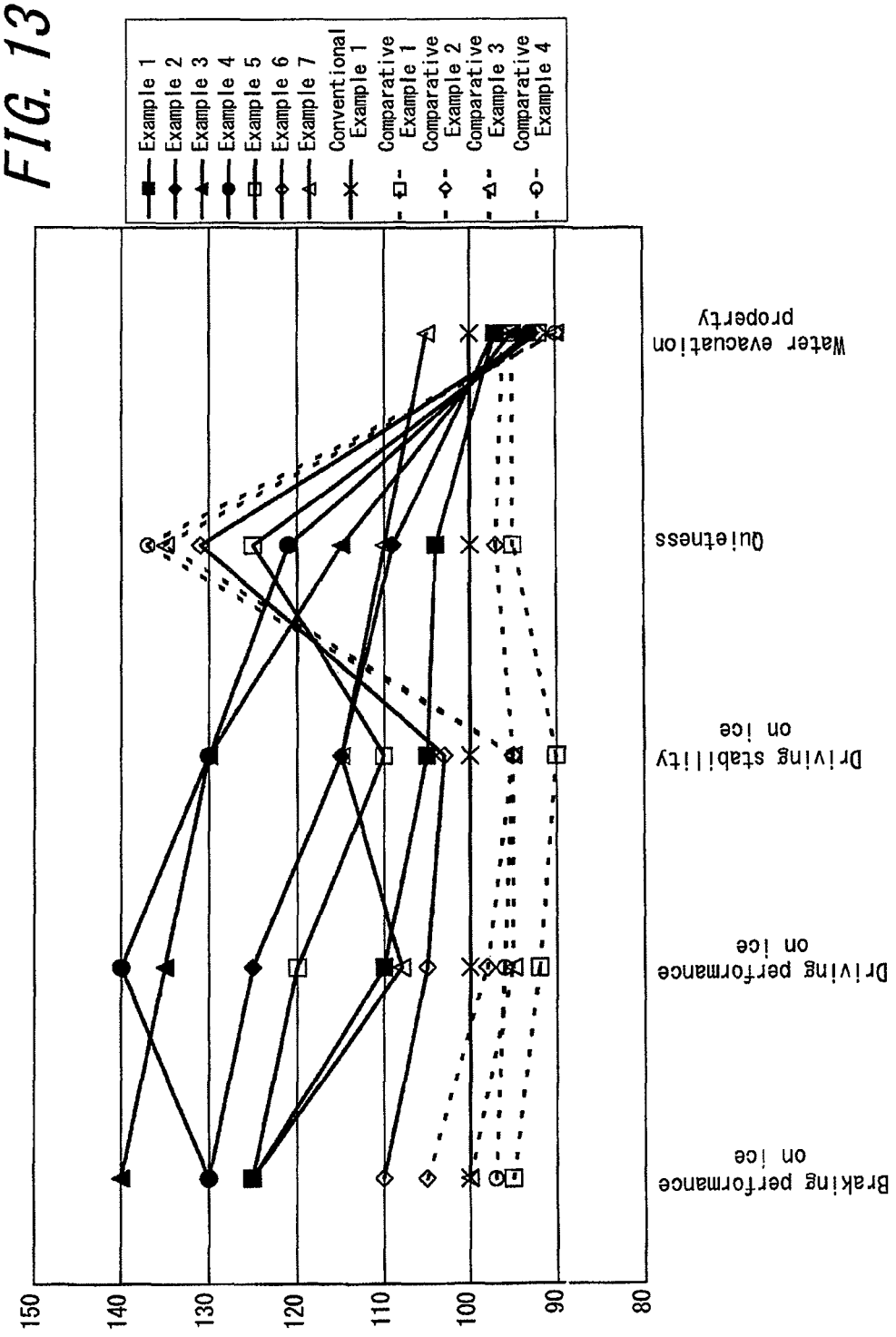
FIG. 13 is a graph illustrating a part of results of performance evaluations on tires of the conventional example and the comparative examples.

From the evaluation results shown in Table 3, Table 4 and FIG. 13, the tires of Examples 1 to 7 exhibit excellent performances concerning the braking performance on ice, the driving performance on ice, the driving stability on ice and the quietness as compared with the tire of Conventional Example 1, and the tire of Example 7 especially exhibits excellent water evacuation property as compared with the tires of Examples 1 to 6 and Conventional Example 1. Further, the tires of Examples 8 and 9 having a small hole or small holes exhibit excellent performances on ice as compared with the tires not having any small hole.

INDUSTRIAL APPLICABILITY

According to the present invention, it is possible to significantly improve the performances on ice, by achieving the securing of excellent ground contact property and edge effect, and the efficient removal of water screen by blocks.

EXPLANATION OF REFERENCE CHARACTERS

1 Tread portion
2 Groove
3 Block
4 Circumferential groove
5 Lateral groove
6 Shoulder block
7 Sipe
9 Small hole
C Equatorial plane
GB Block group
P Reference pitch
W Width of block group
Z Reference zone

The invention claimed is:

1. A pneumatic tire having, in at least a part of a tread portion, a block group formed by arranging blocks close to each other, the blocks being defined by grooves and being independent of each other, wherein,
when a symbol P (mm) stands for a reference pitch length of the blocks in the block group, a symbol W (mm) stands for a width of the block group, a symbol a (pieces) stands for the number of the blocks existing in a reference zone of the block group, the reference zone being comparted by the reference pitch length P and the width W, and a symbol N (%) stands for a negative ratio in the reference zone,
a block number density S, which is the number of the blocks per unit of an actual ground contact area of the block group and given by a formula of $S=a/\{P \times W \times (1-N/100)\}$, is set within a range of not less than 0.003 (pieces/mm$^2$) but not more than 0.04 (pieces/mm$^2$),
the distance (BGL) between the blocks adjacent to each other in the tread circumferential direction is larger than the distance (BGO) between the blocks adjacent to each other in a direction diagonal to the tread circumferential direction,
the distance (BGW) between the blocks adjacent to each other in the tread width direction across the groove between the blocks adjacent to each other in the tread circumferential direction is smaller than the length (BW) of each of the blocks in the tread width direction.

2. The pneumatic tire according to claim 1, wherein the blocks are arranged in zigzag alignment.

3. The pneumatic tire according to claim 1, wherein at least one small hole opening to a surface of the tread portion are provided on more than one block constituting the block group.

4. The pneumatic tire according to claim 3, wherein a diameter at an opening portion of the small hole is in a range of not less than 0.5 mm but not more than 3.5 mm.

5. The pneumatic tire according to claim 3, wherein a depth of the small hole is in a range of not less than 5% but not more than 100% of a height of the block to which the small hole is provided.

\* \* \* \* \*